F. BANGERTER.
THERMAL MOTOR.
APPLICATION FILED APR. 6, 1911. RENEWED JULY 7, 1917.
1,260,300.
Patented Mar. 26, 1918.
13 SHEETS—SHEET 4.
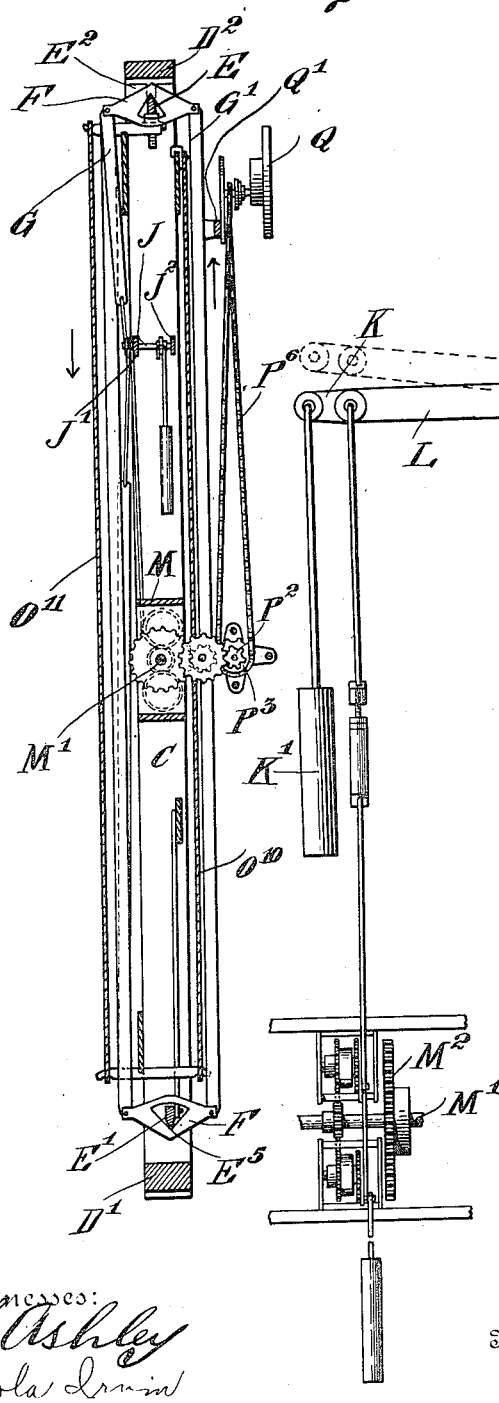
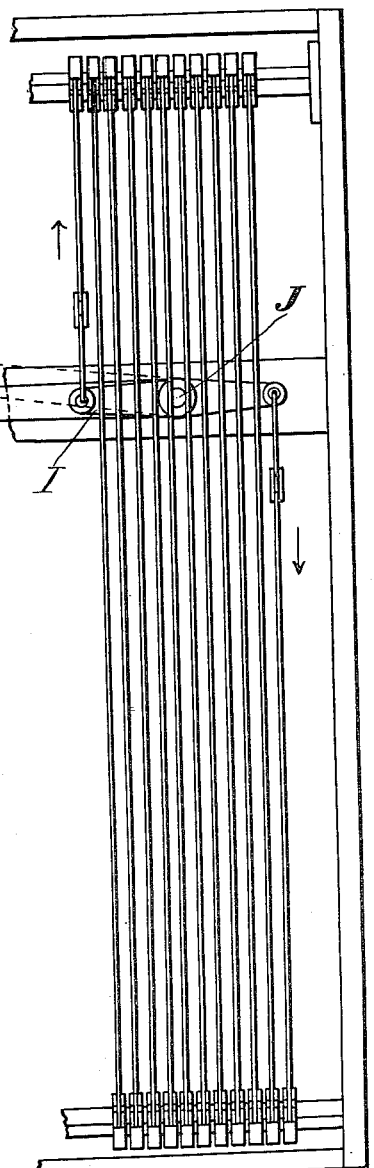

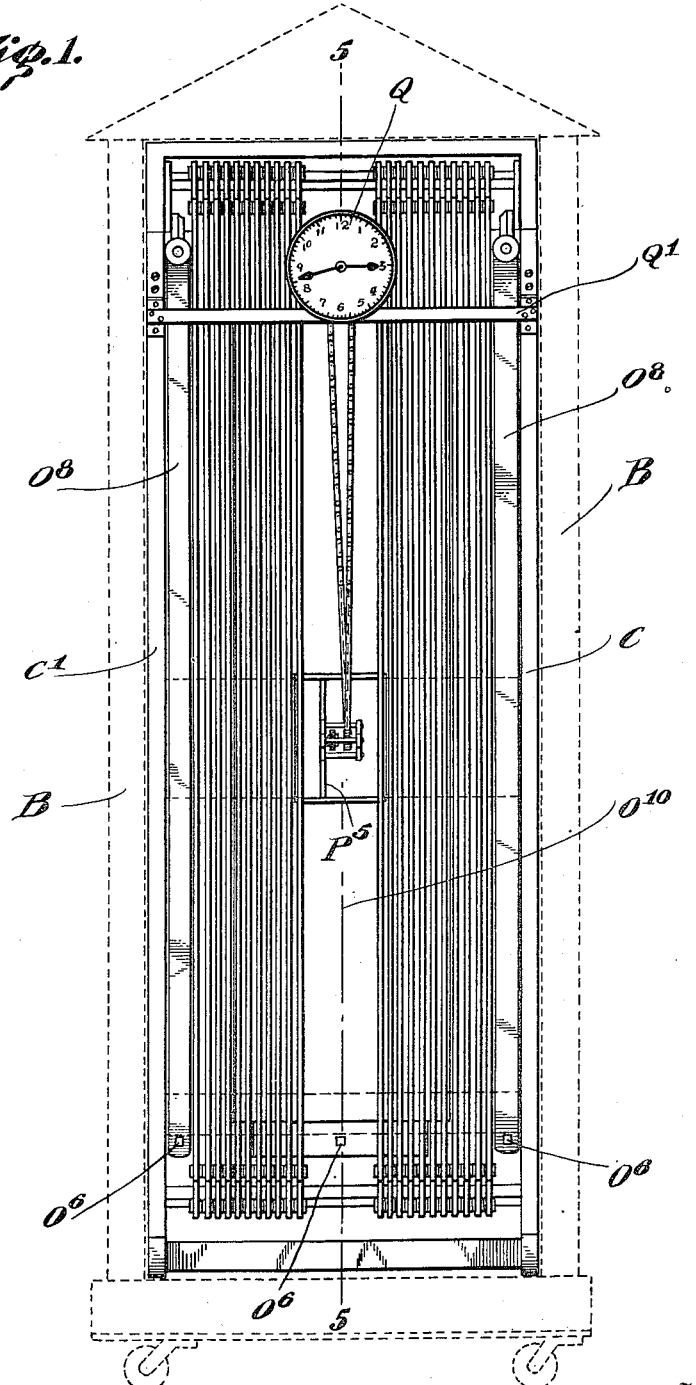

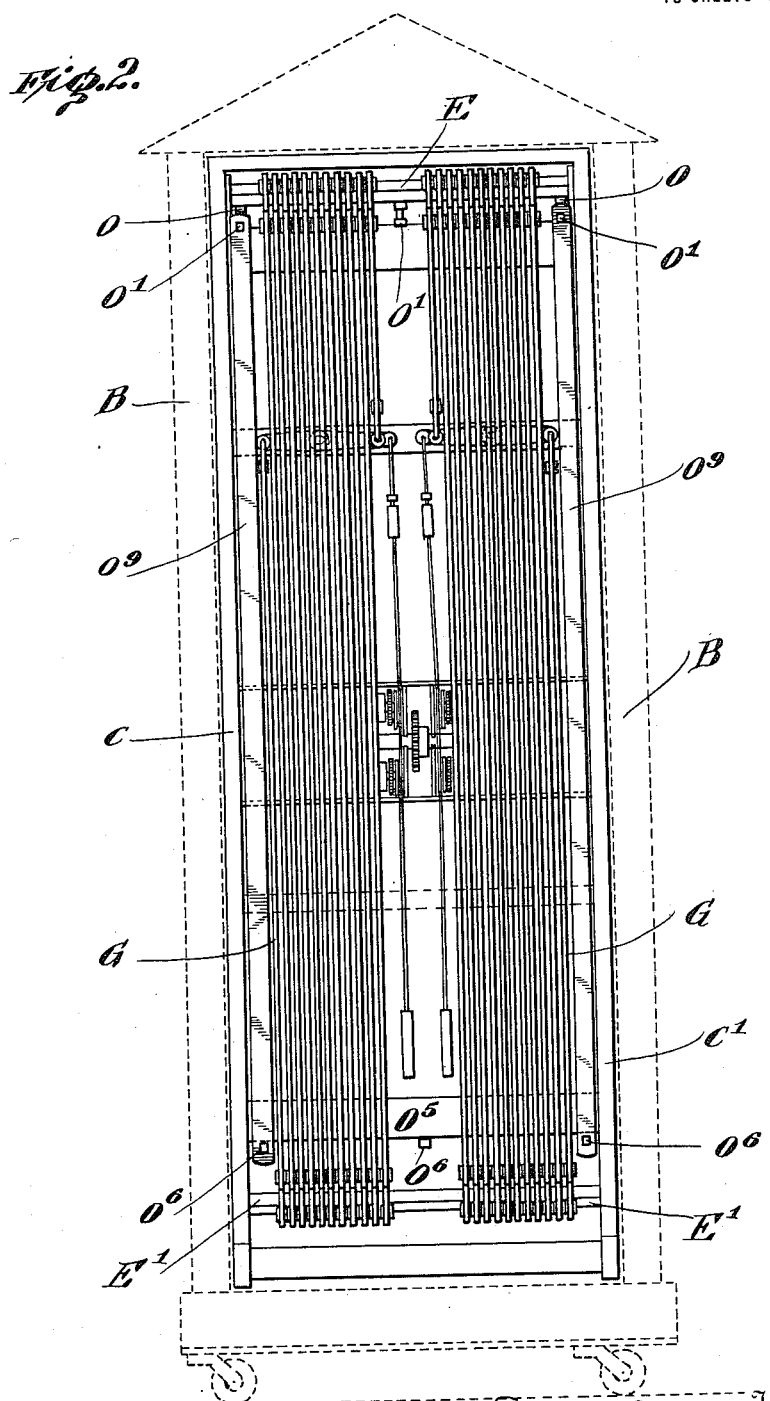

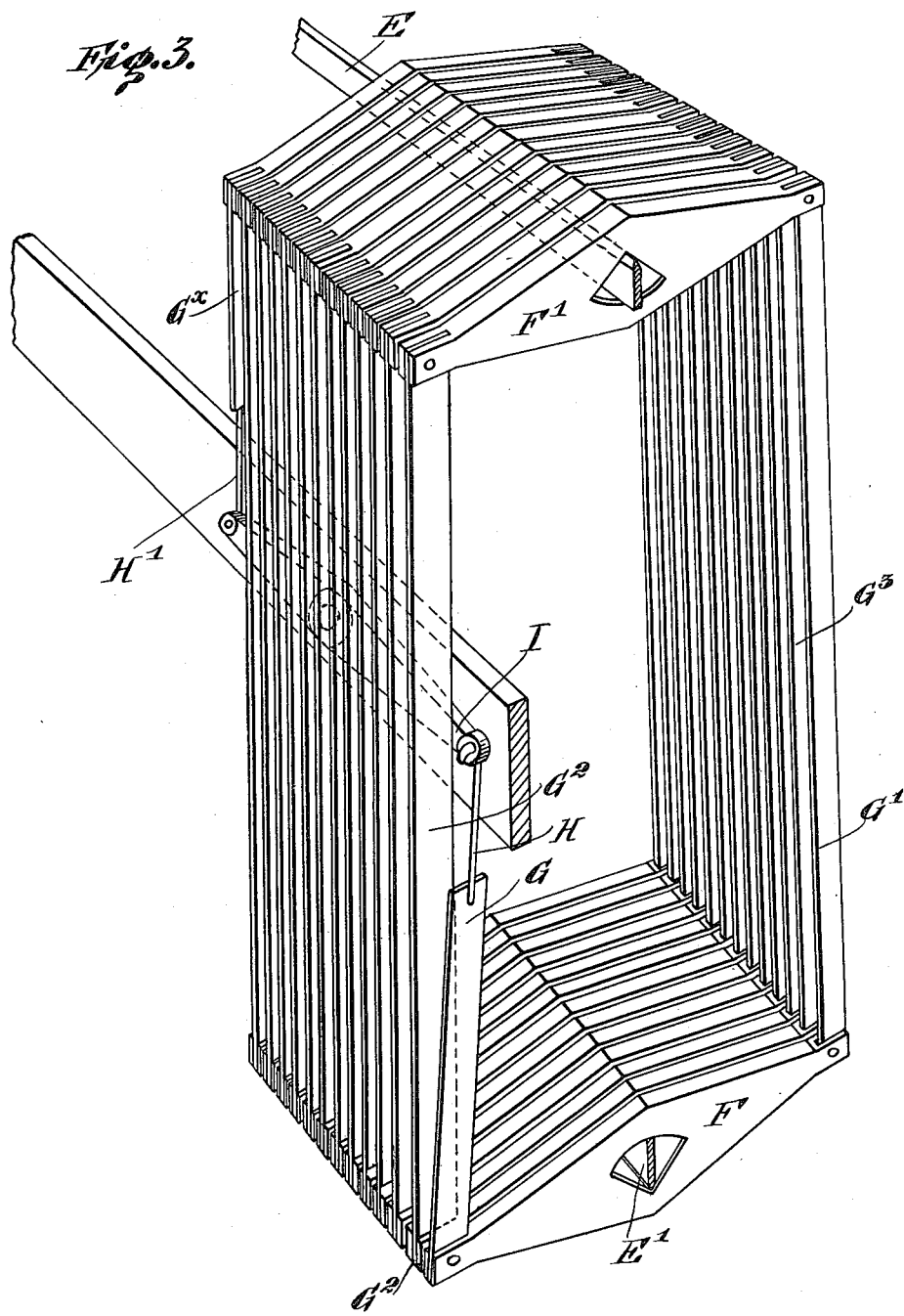

F. BANGERTER.
THERMAL MOTOR.
APPLICATION FILED APR. 6, 1911. RENEWED JULY 7, 1917.
1,260,300.
Patented Mar. 26, 1918.
13 SHEETS—SHEET 5.
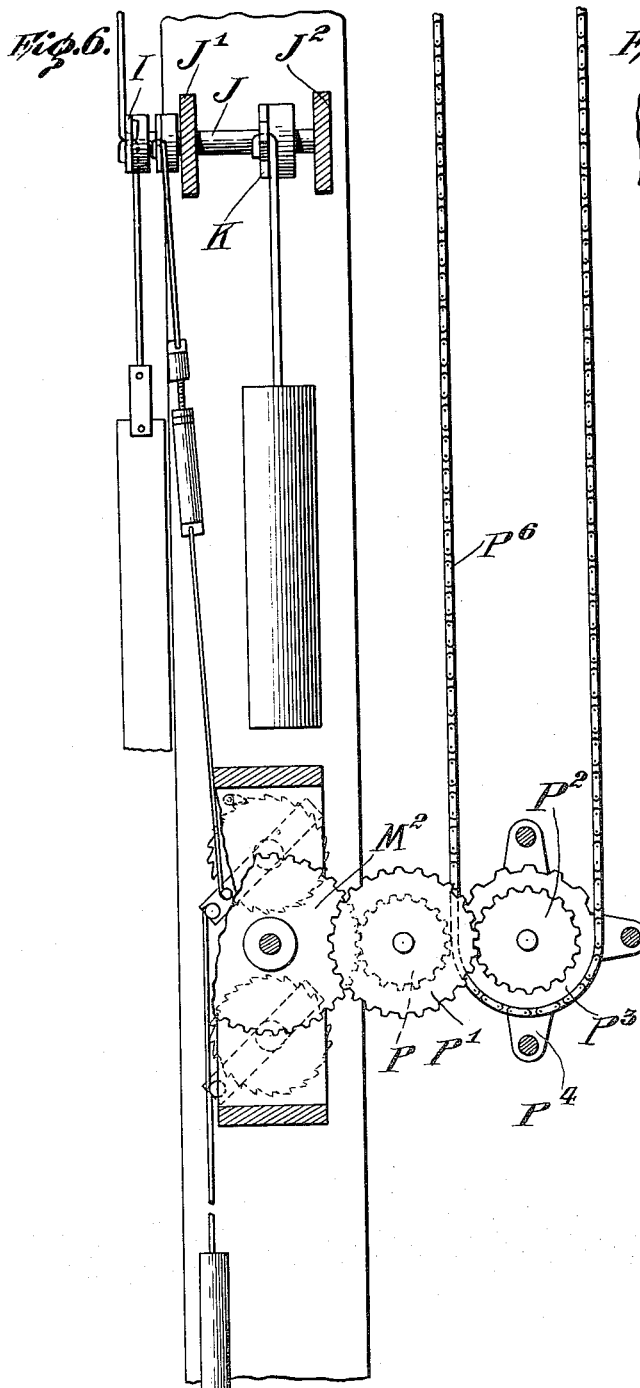
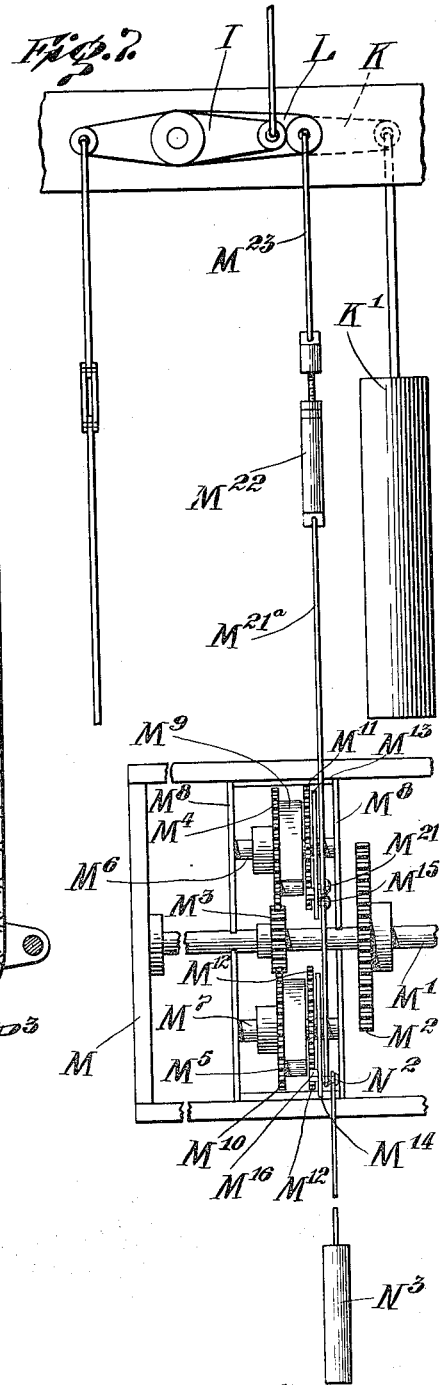

F. BANGERTER.
THERMAL MOTOR.
APPLICATION FILED APR. 6, 1911. RENEWED JULY 7, 1917.

1,260,300.

Patented Mar. 26, 1918.
13 SHEETS—SHEET 6.

Witnesses:
C. S. Ashley
Viola Irom

Inventor
Friedrich Bangerter,
By his Attorneys
Macdonald & Macdonald.

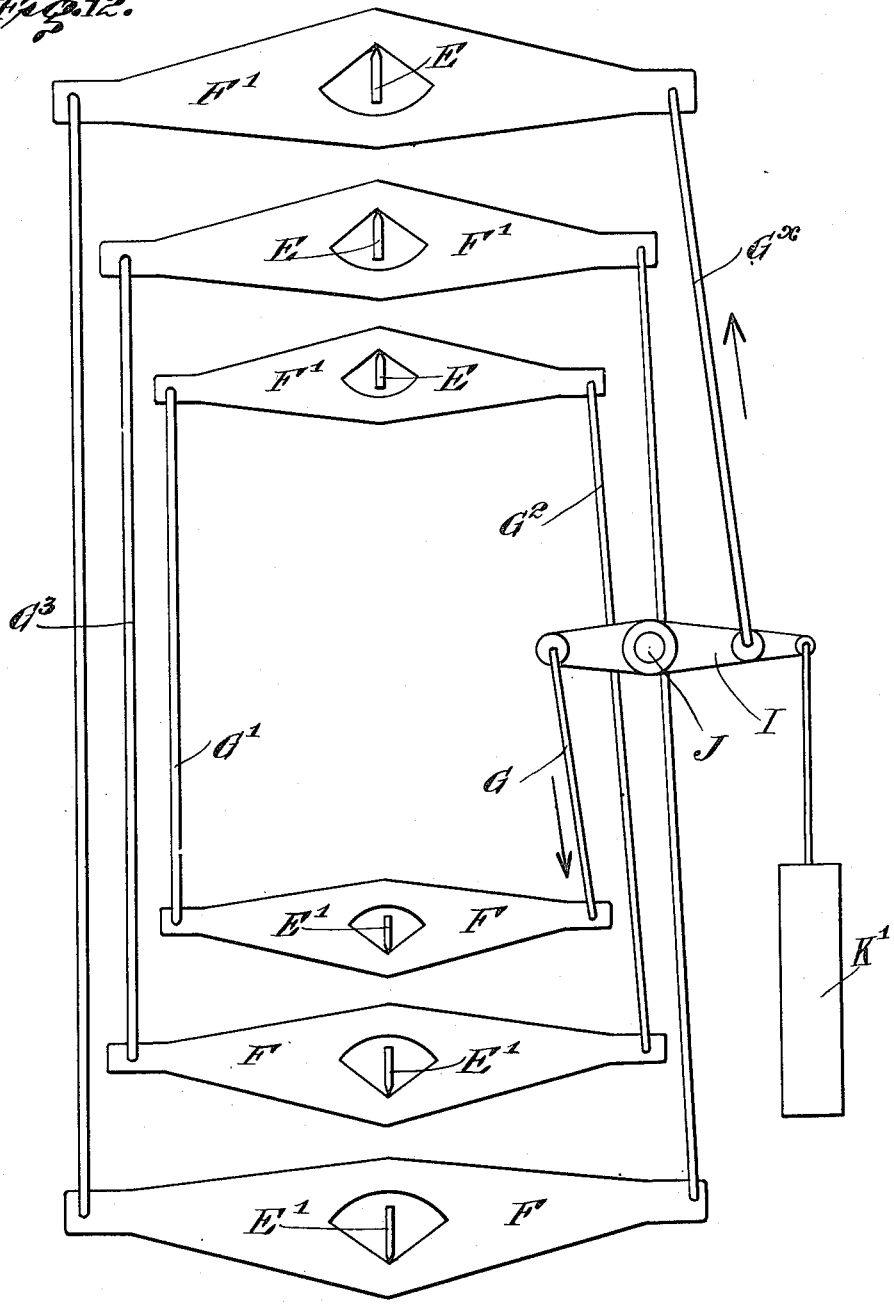

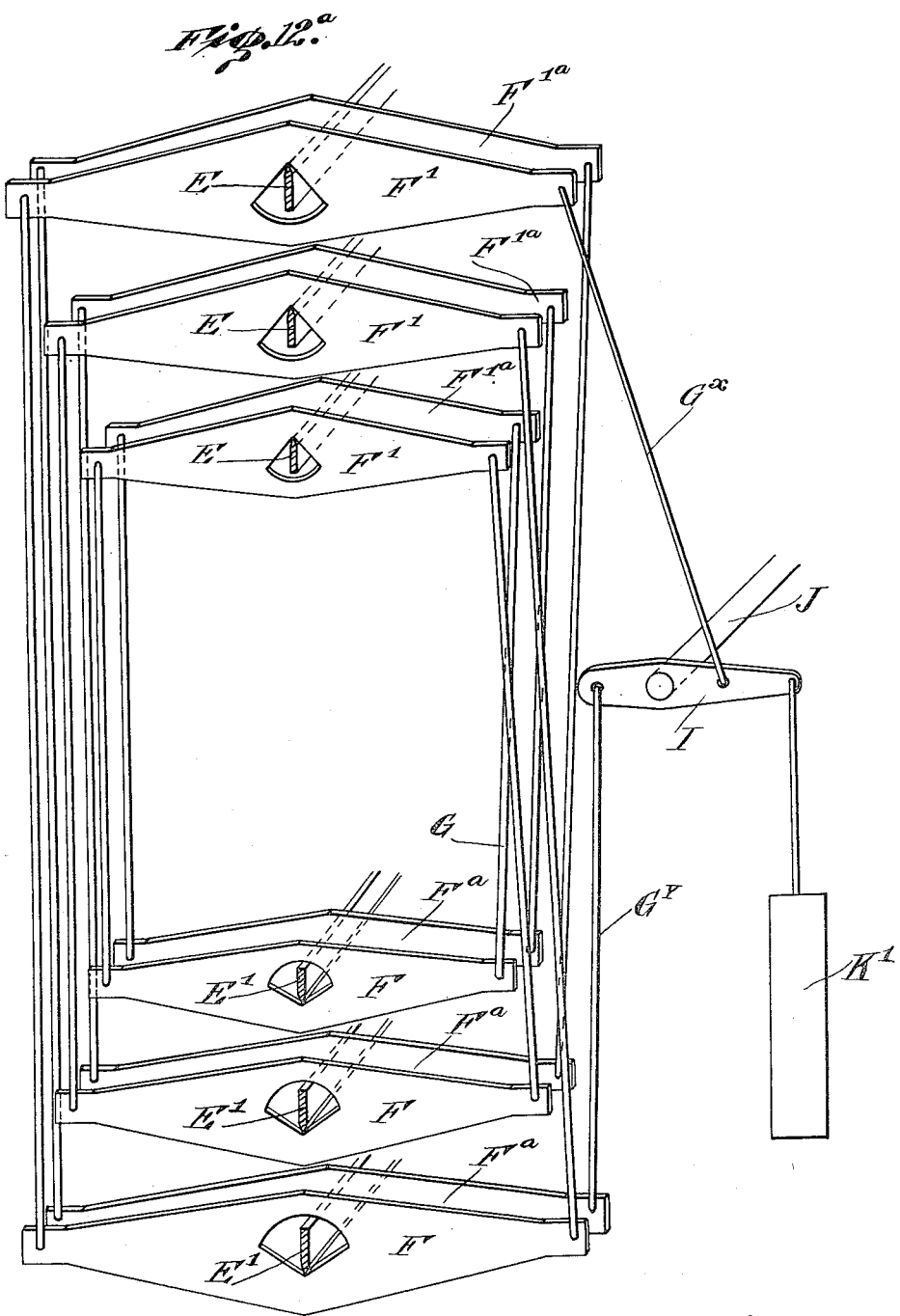

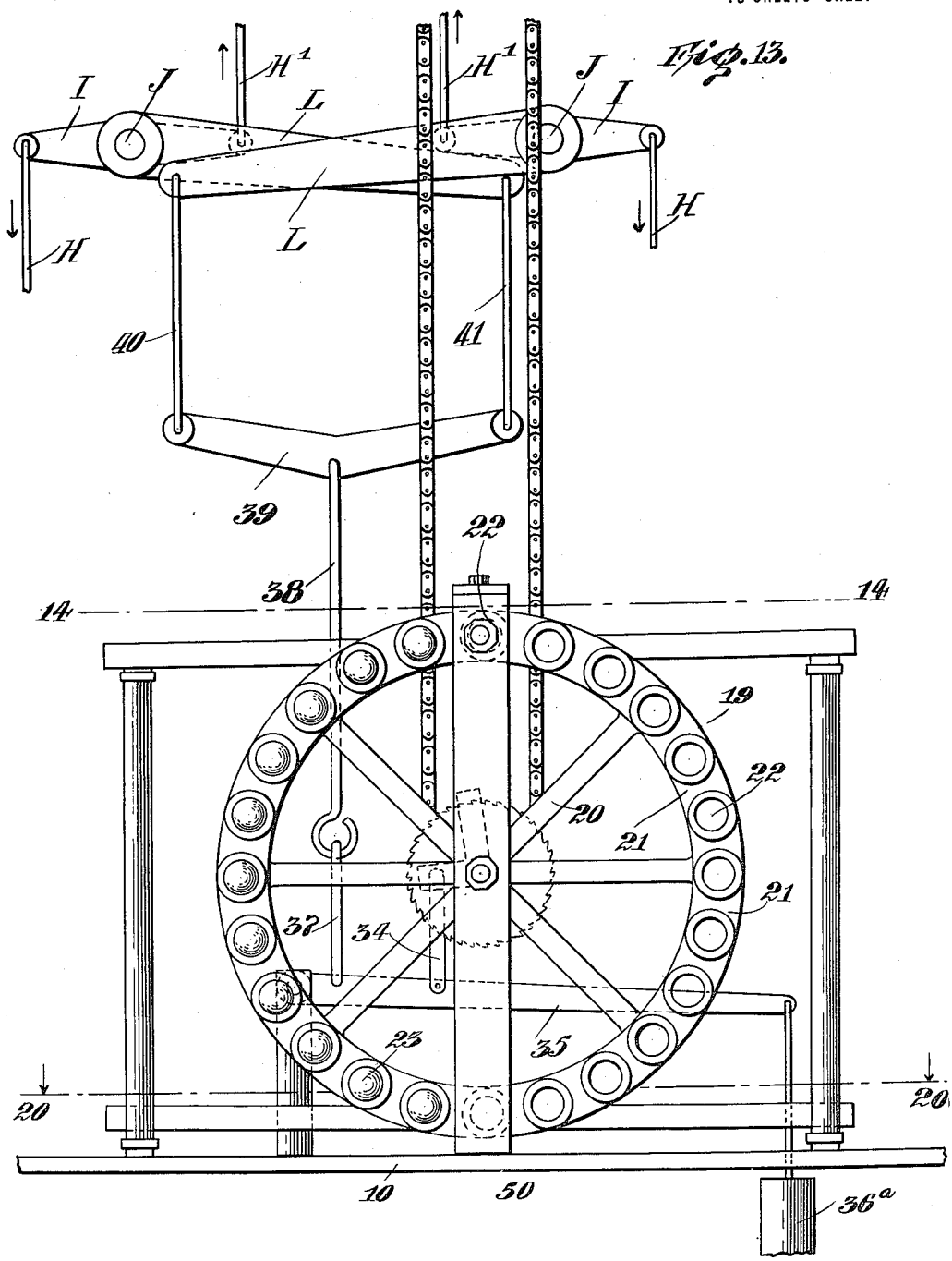

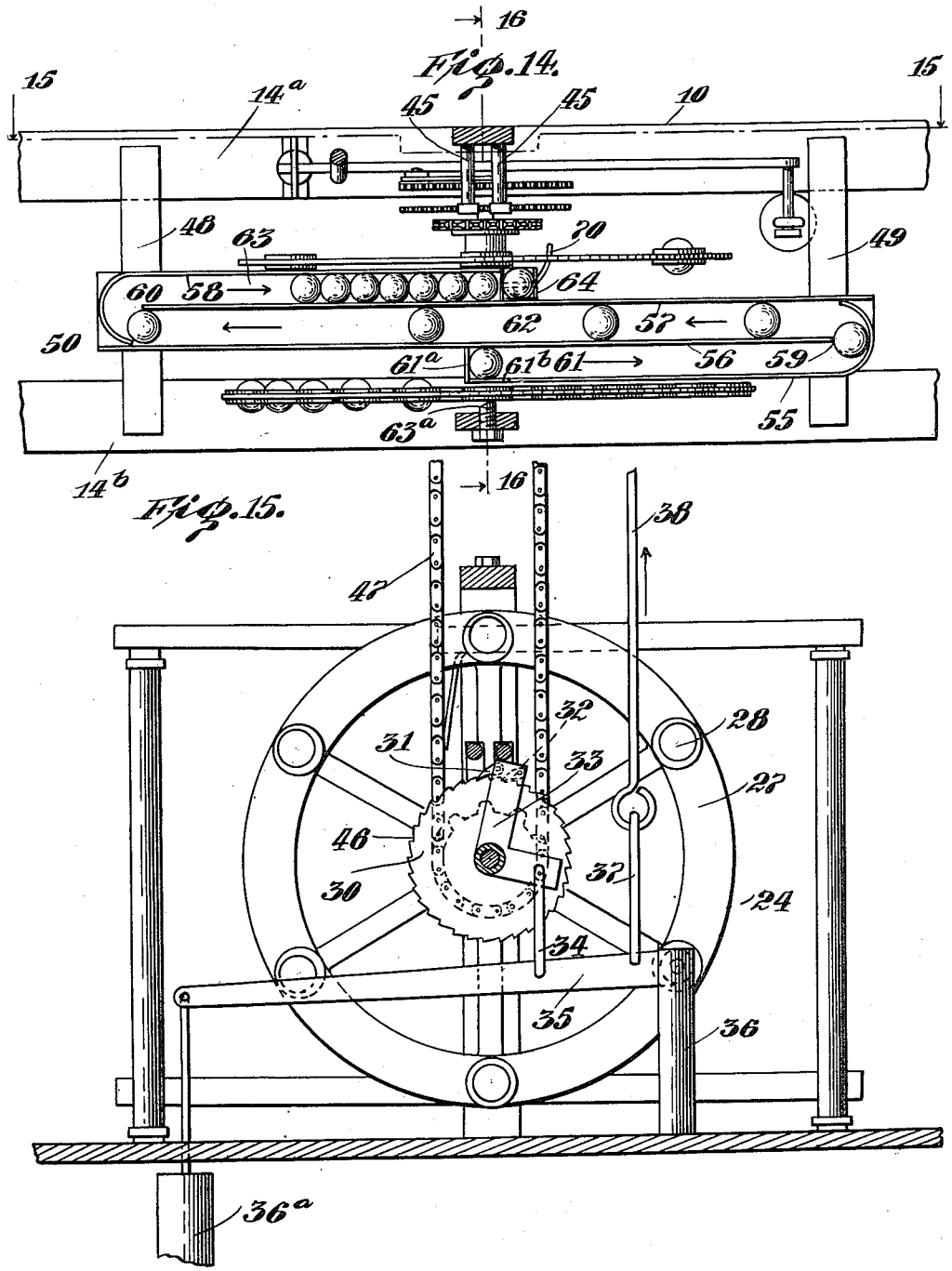

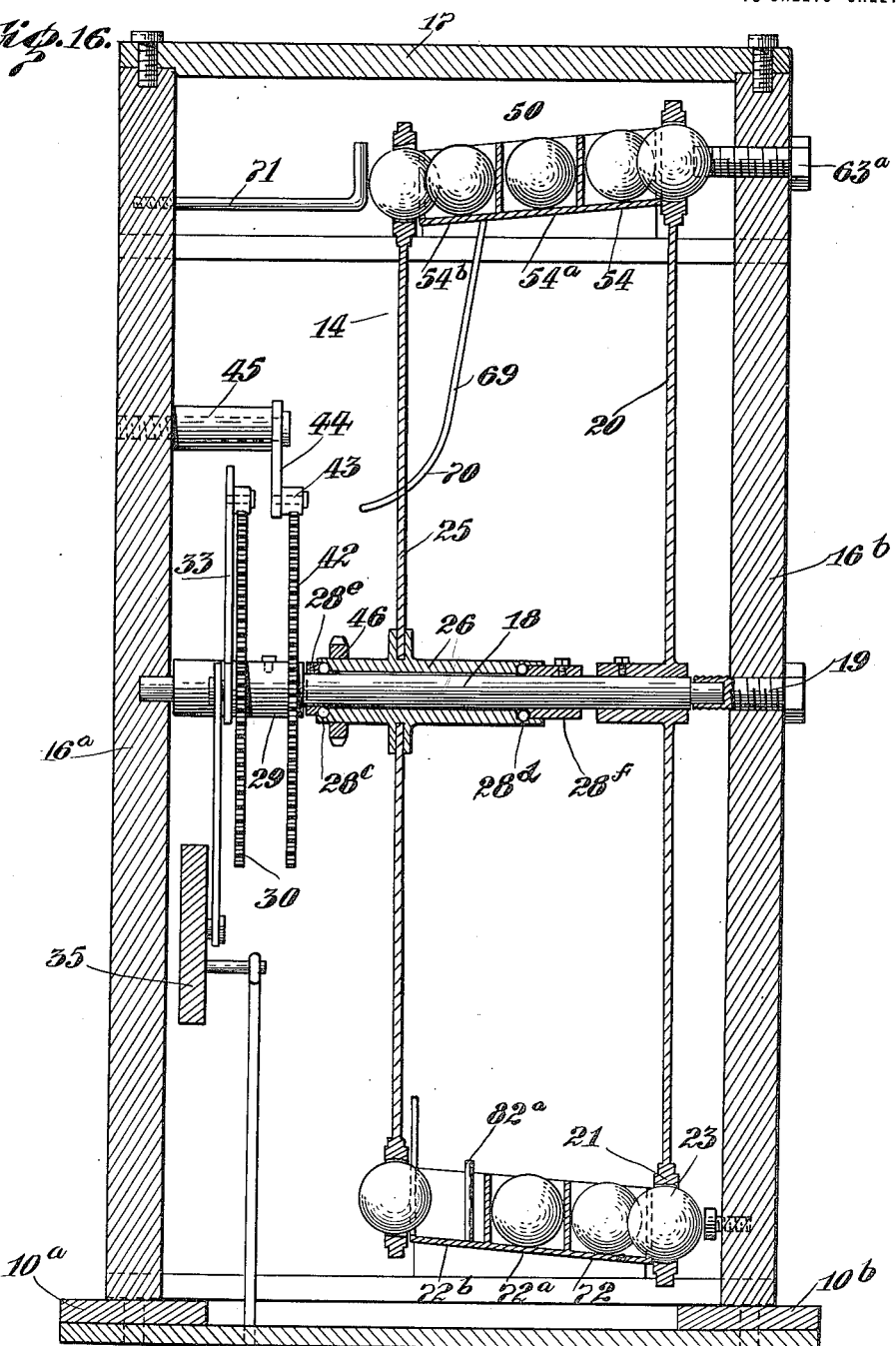

F. BANGERTER.
THERMAL MOTOR.
APPLICATION FILED APR. 6, 1911. RENEWED JULY 7, 1917.
1,260,300.
Patented Mar. 26, 1918
13 SHEETS—SHEET 12.
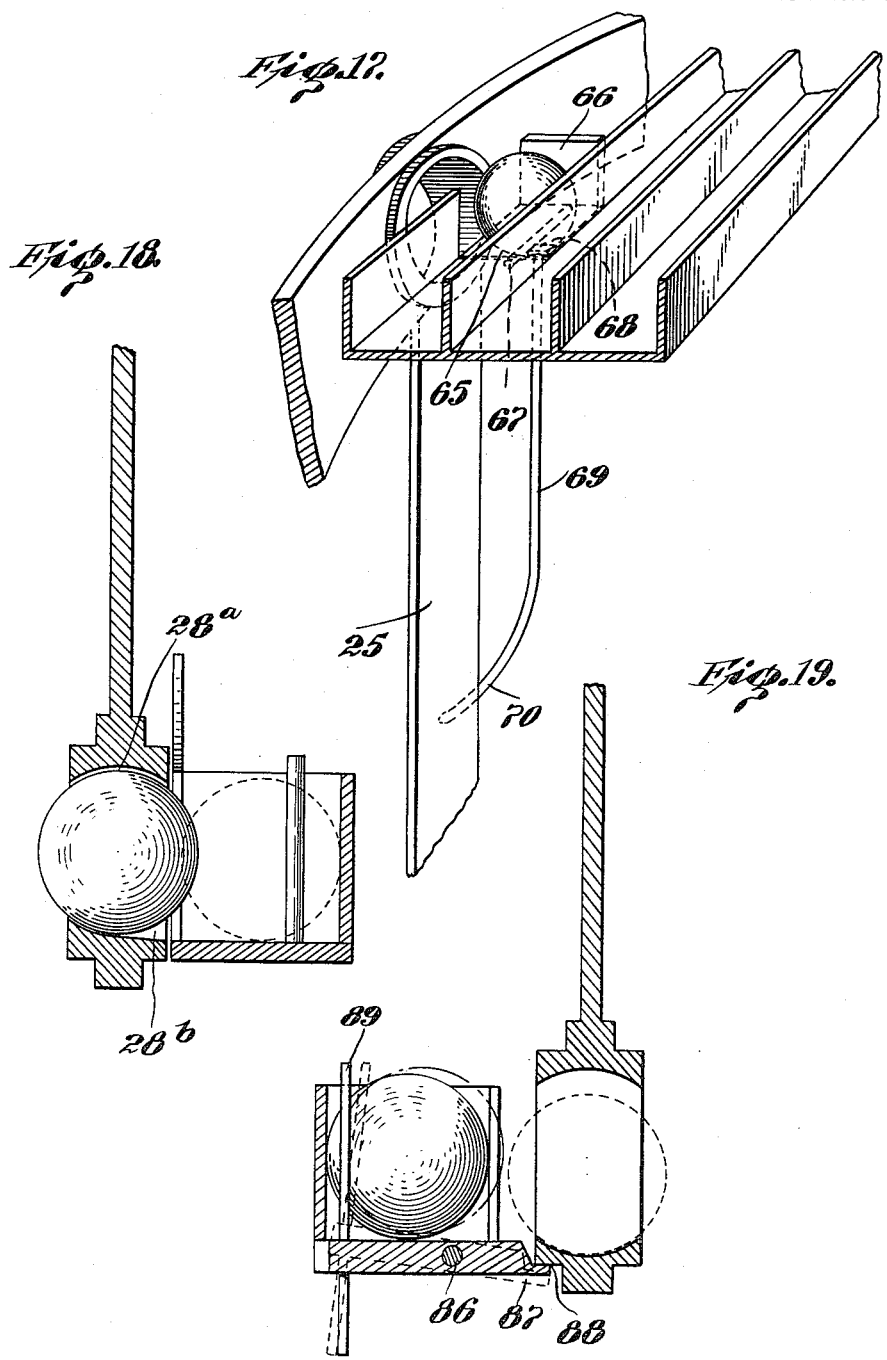

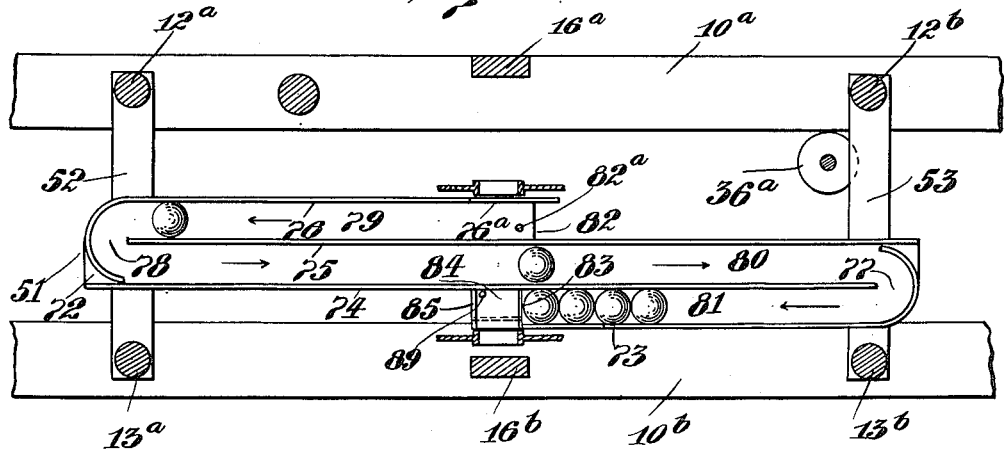

UNITED STATES PATENT OFFICE.

FRIEDRICH BANGERTER, OF NEW YORK, N. Y.

THERMAL MOTOR.

1,260,300.　　　　Specification of Letters Patent.　　Patented Mar. 26, 1918.

Application filed April 6, 1911, Serial No. 619,339. Renewed July 7, 1917. Serial No. 179,271.

*To all whom it may concern:*

Be it known that I, FRIEDRICH BANGERTER, a citizen of Switzerland, and resident of the borough of Richmond, in the city of New York, in the county of Richmond and State of New York, have invented certain new and useful Improvements in Thermal Motors, of which the following is a specification.

This invention relates to thermal motors, that is, apparatus by means of which energy is educed from expansible material, produced by the contraction and expansion of the material, due to variations in temperature. This energy is either stored for future use or is directly applied for the operation of all kinds of machinery or devices.

Two forms of apparatus are herein described for obtaining such expansion and contraction and the required energy therefrom, and two forms are shown in which the energy so obtained is accumulated and stored. In connection therewith, the application of this invention to the running of clocks is described, but it will be understood that the invention is not limited in its application to that particular class of machine, and that it may be applied to any use, of which it is capable.

It is well known that all metals are capable of some degree of expansion and contraction, and some metals have this property in greater degree than others. The ratio of expansion for each degree rise in temperature is quite regular and is called the coefficient of expansion. It is also well known that zinc has a higher coefficient of expansion than most others of the solid metals. For this reason, as well as because of its relatively low cost, zinc is preferably used in the construction of the expansible parts of my apparatus.

One of the objects of this invention, therefore, is to provide an expansion device of novel construction and arrangement, which will generate and maintain motion during changes in temperature, to such an appreciable and useful amount, as to constitute it in fact a thermal motor.

A further object of the invention is to provide means for accumulating or storing the energy thus generated.

A further object is to provide means for applying the energy thus generated and stored.

Other objects, such as compactness, durability and comparatively low cost of the apparatus, will appear in the following description, in which reference is had to the accompanying drawings.

In the drawings—

Figure 1 is a front elevation, showing the application of my invention to a clock provided, in this case, with a main spring as usual;

Fig. 2 is a rear elevation of the same with a part removed;

Fig. 3 is an enlarged perspective detail showing how the strips forming part of the expansion member or coil are connected up;

Fig. 4 is a sectional view, on lines 5—5 of Fig. 1;

Fig. 5 is an enlarged detail elevation, with parts removed.

Fig. 6 is an enlarged detail cross section of the central portion of the apparatus, with part broken away;

Fig. 7 is a rear elevation of the same with parts broken away;

Fig. 12 is an elevation of a modification of the expansion coil;

Fig. 12ᵃ is a perspective view showing how two of such modified expansion coils may be connected;

Fig. 13 is a front elevation showing my invention applied to another form of force storage mechanism;

Fig. 14 is a plan view of same on lines 14—14 of Fig. 13;

Fig. 15 is a rear elevation on lines 15—15 of Fig. 14;

Fig. 16 is a vertical section on lines 16—16 of Fig. 14;

Fig. 17 is an enlarged detail of part of the apparatus shown in the upper portion of Fig. 16;

Fig. 18 is an enlarged detail of the ball-discharging means shown in the lower portion of Fig. 16;

Fig. 19 is an enlarged detail of the loading device shown in the opposite part of the lower portion of Fig. 16; and, Fig. 20 is a plan view on lines 20—20 of Fig. 13.

Referring to the construction illustrated in Figs. 1 to 11 inclusive, B represents the outer casing of the apparatus.

Mounted within the outer casing B is an inner frame comprising the uprights C, C', which are rigidly secured by cross-bars D', D².

The outer casing B as well as the inner frame uprights C, C', are preferably formed of wood or other material capable of a low degree of expansion.

Within the upper and lower ends of the inner frame are anti-friction knife-bars E, E' (Fig. 2,) the upper one of which, E has each end within a vertically disposed slot E² (Figs. 4, 8 and 9) in the uprights C, C', within which said knife-bar may be moved vertically, as hereinafter described.

Figure 9:
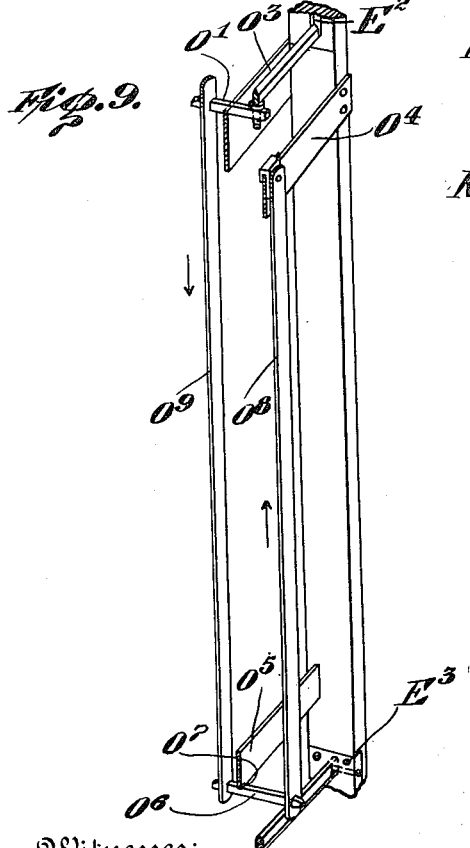
Fig. 9 is a perspective detail, partly broken away.

Each end of the lower knife-bar E' lies immovable within a recess in a plate E³ mounted on each of the uprights C, C' (Fig. 9).

These knife-bars, which are preferably formed of hardened steel, have oppositely disposed relatively sharp edges E⁵, which act as bearings for a series of horizontally disposed anti-friction levers F, F', which I will term balance-levers since they are intended to balance evenly and freely on the thin edges of the knifebars with little friction somewhat in the nature of a scale-balance. These levers are pivotally connected to a series of metallic expansion strips G, G', G², G³, etc., the construction and arrangement and manner of connecting up the same being more clearly shown in Fig. 3.

It will be observed that the arrangement of the levers F and expansion strips G, G', etc., is such as to form, in effect, a helix, the short strip G being connected to one end of one of the balance-levers F, and the strip G' being connected at its lower end to the opposite end of said lever, the upper end of said strip G' being connected to one end of the first one of the levers F'. To the opposite end of said lever the upper end of strip G² is connected, the lower end of said strip being connected to the left-hand end of the second one of the levers F, and so on to the final short strip Gˣ. The levers F, F' must be formed of a metal capable of withstanding great strain without bending and for this purpose the metal known as macadamite may be used.

For convenience of designation each of these groups of balance-levers F, F', and expansion strips G, G', etc., will be referred to as expansion coils, and while in Figs. 1 and 2 but two sets of such expansion coils are shown, it is to be understood that there may be any number of such sets desired, and any desired number of strips and levers composing such coils, depending upon the character of the work to be performed.

Furthermore, it is desired to be understood that when using the terms "strips"—as characterizing the members connecting the balance-levers—either in the specification or claims, no limitation is thereby intended to the particular form of connecting members or "strips" shown but in the use of the term "strips" are included any form such as wires, rods or bars, of either square, round, hexagonal or other cross sectional shape.

The ends of the short strips G, Gˣ are connected by wires H, H' with the opposite ends of what will be termed a coil lever I, which, as more clearly shown in Figs. 5, 12 and 12ᵃ, is keyed to a shaft J, which latter has its ends journaled upon the cross-bars J', J² secured to the uprights C, C', of the inner frame of the apparatus, and this shaft is named a coil shaft.

Keyed to the coil shaft J is a lever K (Fig. 5) which it may be proper to designate as a stress lever, since from it is suspended a weight K, the function of which is to place a certain amount of stress upon the series of expansion strips and balance-levers composing the expansion coil, keeping the elements of the strips slightly stretched and preventing any loss of motion at the different points of connection and thereby furthering a very important object, which is, to make of each series of expansion strips and balance-levers a single spiral unit, throughout which the expansion and contraction of the strips is transmitted.

Also keyed to the shaft J is a power transmission lever L, and any rotary motion imparted to said shaft is necessarily imparted to the lever L in the form of oscillatory motion.

Referring now to the power storage device (Figs. 4, 6, 7 and 10) one or a number of which may be used in connection with my expansion coils, there is disposed, approximately midway of the uprights C, C' and within casing M, secured at its ends to said uprights, a rotatably mounted power transmission shaft M', keyed to which is a spur wheel M²; also mounted on the shaft M' is a spur wheel M³, meshing with which at its upper and lower sides are two spur wheels M⁴, M⁵, loosely mounted upon short supporting shafts M⁶, M⁷ journaled in uprights M⁸, M⁸, secured to the casing M. To each of the spur wheels M⁴, M⁵, is secured the outer end of a coil spring M⁹, M¹⁰, respectively, the inner ends of said springs being secured to the respective shafts M⁶, M⁷, the arrangement being such that when the springs are placed under tension by the rotation of the shafts M⁶, M⁷, the force of the springs rotates the spur wheels M⁴, M⁵, thereby rotating the spur wheel M³, shaft M′ and the spur wheel M².

Figure 8:
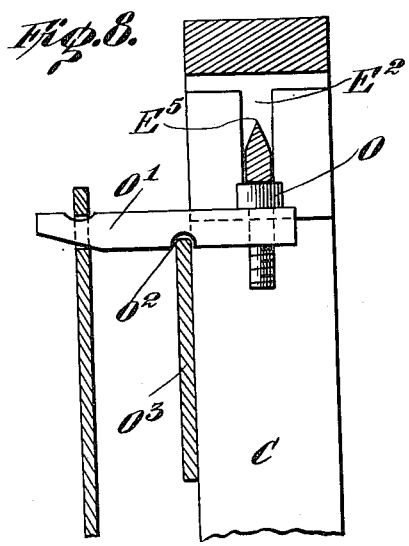
Fig. 8 is an enlarged detail of the upper portion of the apparatus shown in Fig. 4, with parts removed.
Figure 10:
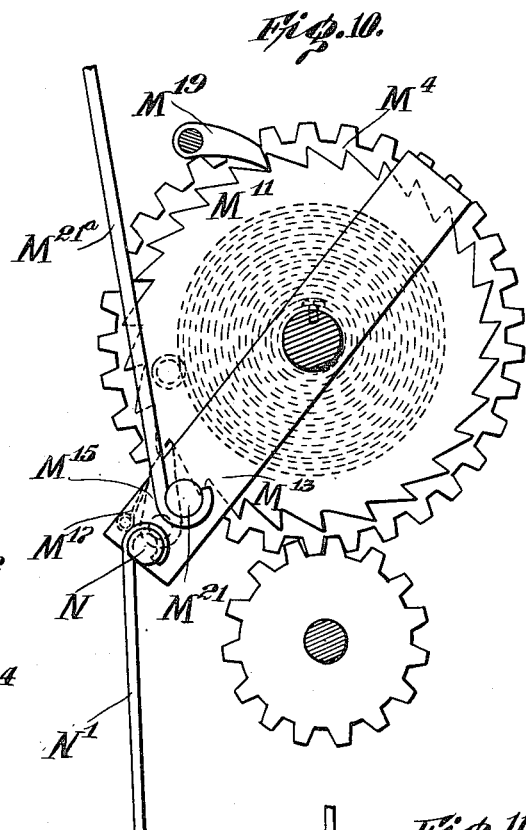
Fig. 10 is an enlarged detail of a portion of the ratchet mechanism shown in the lower portion of Figs. 6 and 7.

Also mounted upon each of the respective short shafts M⁶, M⁷ and keyed thereto, is a ratchet wheel M¹¹, M¹², and adjacent thereto, and loosely mounted upon each of said shafts M⁶, M⁷ is a pawl carrier plate M¹³, M¹⁴, each carrying a pawl indicated at M¹⁵, M¹⁶, which is adapted to engage the teeth of the ratchet wheels M¹¹, M¹², being held in engagement therewith by springs, one of which is shown at M¹⁷ Fig. 10, secured to said pawl carrier M¹³. Suitably mounted upon the casing M, and adapted to also engage the teeth of the ratchet wheels M¹¹, M¹² is a detent M¹⁹, to prevent reverse movement of said ratchet wheels.

The pawl carrier plate M¹³ (Fig. 7,) is provided with a pin M²¹, and secured thereby loosely to said carrier is one end of a connecting rod, M²¹ᵃ, the other end of said connecting rod being connected to one end of a yieldable coupling M²², the other end of said coupling being secured by means of the connecting rod M²³ to the power transmission lever L. The function of the flexible coupling M²² will be hereinafter referred to.

The pawl carrier M¹³, Fig. 10, also carries, at its lower end, a pin N, and loosely mounted thereon is one end of a connecting link N′, the other end of said rod being connected to a similar pin N² secured to the second pawl carrier M¹⁴, whereby, when motion is imparted to the one pawl carrier M¹⁵ and, through the pawl M¹⁵ to the ratchet wheel M¹¹ motion is also imparted to the second pawl carrier M¹⁴, and through its pawl M¹⁶ to the ratchet wheel M¹². From the pin N² is suspended a weight N³ for the purpose of returning the pawl carriers to their normally lowermost positions when they complete their upward travel.

Figure 11:
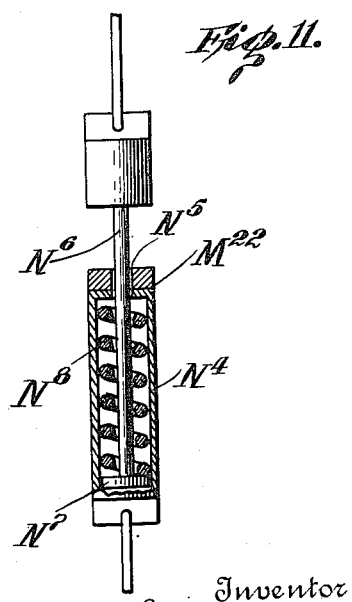
Fig. 11 is an enlarged section of a flexible coupling shown in Fig. 7.

The flexible coupling M²², Fig. 11, comprises a tubular casing N⁴, which is provided at one end with an opening N⁵, through which projects a rod N⁶, having a head N⁷, which is adapted to bear against a spiral spring N⁸ contained in said casing, the other end of said rod N⁶ being connected to the rod M²³.

The operation of the apparatus, as thus far described, will be more readily apparent from an inspection of Fig. 5.

Assuming that the expansion coil there shown has been subjected to a normal temperature of say 75 degrees Fahrenheit, and at that temperature the lever L is in the position shown in full lines, on a decrease in temperature of say 10 degrees, the coil, which will operate upon its entire length, will exert a pull on the links H, H′ at the ends thereof in the direction of the arrows, the result of which will be to rotate the shaft J and raise the levers L and K against the weight K′, to the position shown in dotted lines, thereby actuating the ratchet wheels M¹¹, M¹², Fig. 7, and winding up the springs M⁹, M¹⁰ of the power-storage device. The force stored thereby is afterward taken off, as required, through the medium of the power transmission shaft M′, spur wheel M² and any suitable gearing or power transmission means.

The function of the flexible coupling indicated at M²² will now be quite clear. The coil spring N⁸ (Fig. 11) must be sufficiently strong to resist the pull of the lever L, except when the springs M⁹, M¹⁰, are wound full. When that condition exists, the coil spring N⁸ will yield under the force of the lever L, and no further power will be applied to the springs M⁹, M¹⁰. When, however, those springs have become unwound to a sufficient extent, the spring N⁸ of the coupling M²² will not yield but will transmit, from the expansion coil, the force necessary to wind said springs should they become unwound; otherwise the force will be expended in simply compressing the coil spring N⁸ and have no effect upon the springs of the power-storage device.

Referring now to the force-increasing devices, which are more clearly shown in Figs. 1, 2, 4, 8 and 9, there is a support O, in the form of a flat-headed bolt (Fig. 8), near each end of the upper knife-bar E, and contacting therewith at its under surface, the shank of said bolt passing through one end of lever O′, which is fulcrumed at O² upon the upper surface of a cross-bar O³, securely fastened to the rear portion of the uprights C, C′. To the front side of said uprights is rigidly secured a second cross-bar O⁴, Fig. 9, and at the lower portion of said uprights and rigidly secured thereto is a third cross-bar O⁵, against the under surface of which rests a lever O⁶ having its fulcrum point at O⁷.

As shown in Fig. 2, there are three of the levers O′, at the upper end of the expansion coils at the rear side thereof below the knife-bar E, and above the cross-bar O³, one lever at each end of said bar and one in the middle thereof. As these levers act directly upon the under surface of the knife-bar E to raise the same, they are called knife-bar lifting-levers. There are also the same numbers of levers O⁶ at the lower end of the expansion coils below the cross-bar O⁵ projecting through to the forward side of the apparatus, as shown in Figs. 1 and 2.

Rigidly secured to the cross-bar O⁴, Fig. 9, is one end of a relatively heavy metallic expansion strip $O^8$,—preferably formed of zinc—the lower end being secured to one end of the lever $O^6$; to the opposite end of the lever $O^6$ is secured the lower end of a similar but longer zinc strip $O^9$, the upper end of the strip $O^9$ being secured to the rear end of the lever $O'$. As shown in Figs. 1 and 2, there are two of these strips $O^8$ at the front and two of the strips $O^9$ at the rear of the apparatus.

In addition to the heavy strips $O^8$, $O^9$, there is provided at the front of the apparatus a heavy wide expansion sheet or strip $O^{10}$, Figs. 1 and 4, which, at its upper end, is rigidly secured to the cross-bar $O^4$, and at its lower end to the front end of the middle one of the levers $O^6$. A similar heavy wide expansion sheet or strip $O^{11}$ is secured, at its lower end, to the rear end of the middle lever $O^6$, and, at its upper end, to the middle one of the levers $O'$.

These heavy strips $O^8$, $O^9$, and sheets $O^{10}$, $O^{11}$, are preferably formed of zinc, and are not only capable of great expansion and contraction, but will be capable by their contraction of lifting the entire weight of the knife-bars, E, E', with the carried balance-levers and expansion strips of expansion coils. The operation thereof is as follows:

The front strips $O^8$ and rear strips $O^9$ and the front sheet $O^{10}$ and the rear sheet $O^{11}$ are connected to the levers $O^6$ so as to form, in effect, single expansion strips and sheets of relatively great length. They are fastened, however, at their front upper ends to the cross-bars $O^4$ so that the expansion cannot extend beyond that point and takes place in a direction toward the opposite end, and of course the contraction takes place in the opposite direction. Assuming now that at a temperature of say 75 degrees Fahrenheit these heavy strips and sheets lie in the position shown in Figs. 4 and 9 (heavy strips $O^8$, $O^9$ being shown in Fig 9, and the heavy wide sheets $O^{10}$, $O^{11}$ in Fig. 4), on a decrease in temperature of say five degrees Fahrenheit, the heavy strips $O^8$, $O^9$ and sheets $O^{11}$, $O^{12}$ will contract, pulling together the rear ends of the levers $O'$, $O^6$, and by means of the levers $O'$ lifting the knife-bar E, and the balance-levers suspended thereon. The result is that the normal displacement of the ends of each expansion coil is increased to the extent of the lifting of the knife-bars, due to the contraction of the metal strips $O^8$, $O^9$ and sheets $O^{10}$, $O^{11}$.

It has been found by experiment, as well as observation, that the average daily change of temperature in residence and office buildings, is about five degrees. On even a low average of temperature change, this apparatus is able to generate force in larger amounts than required, and the surplus will be stored in a power-storage device such as above described and by means hereinafter referred to, may be drawn upon at a time when the average temperature is approximately uniform.

For clearness of illustration, but two sets of expansion coils have been shown and described though there is no limit to the number that may be used. Assuming that an apparatus has four expansion coils, comprising sets of 50 balance-levers each giving a total of 200 levers, with expansion strips of the same number, in 5-foot lengths, the four coils would have a total length of 1000 linear feet of zinc strips, which entire length expands or contracts on the slightest change of temperature. The expansion or contraction of this 1000 feet of zinc strips, for every temperature change of 5 degrees Fahrenheit will be approximately 1 inch. Now, assuming that the knife-bar E is pulled upward by the heavy strips $O^8$, $O^9$, and sheets $O^{10}$, $O^{11}$ each of five feet length, (making ten feet for the front and rear strips and sheets), on a decrease in temperature of 5 degrees Fahr. the contraction of the strips and sheets $O^8$, $O^9$, $O^{10}$, $O^{11}$, and, therefore, the upward displacement of the bar E will be approximately $\frac{1}{100}$ of one inch; this amount of displacement is multiplied as many times as there are levers and strips in the expansion coils, viz., 200 times, which would be about two inches, and this, together with one inch from the contraction of the expansion coils alone, results in a total displacement of the links H, H', at the end of the coil of about three inches. Assuming that the mechanism is sufficiently strong to lift 100 pounds, the work performed would be equivalent to the potential energy of 100 pounds raised three inches. Inasmuch as thirty-three per cent. approximately, must be deducted for loss by stress (it being necessary to place the coils under strain, by means of the weight K', as shown in the drawings and described above), the final result is a force to lift a load of 100 pounds 2 inches high, or 10 pounds 20 inches, and this force is sufficient to run a large-sized time clock.

As illustrated in Figs. 4, 5, 6 and 7, the power applied by the springs $M^9$, $M^{10}$, to the power transmission shaft M', is taken, through the spur wheel $M^2$ by means of any suitable gearing, to run a clock or any other machine adapted to the purpose. Fig. 6 shows the spur wheel $M^2$ meshing with a pinion P, through which is driven the spur wheel P', which latter meshes with a pinion $P^2$, through which is driven a sprocket wheel $P^3$ carried by the bracket $P^4$, which latter, as well as the shafts carrying said spur wheels and pinions, are supported by an upright $P^5$, Fig. 1, mounted upon the casing M. The sprocket wheel $P^3$ carries a sprocket chain P⁶, which, through any suitable gearing, is adapted to wind the main spring of a clock indicated at Q, carried by suitable supports on the cross-bar Q' secured to the uprights C, C'. As this clock may be of any well known form, it will not be necessary to describe the same in detail, except to state that as soon as the main spring of the clock becomes weaker than the springs of the power-storage device illustrated in Fig. 7, the latter will wind the clock main spring, and in this manner it is always kept at a uniform high tension, so desirable in good time-keeping.

Fig. 12 shows a modification of the expansion device of this invention, wherein, instead of having the balance-levers F, F', arranged side by side forming a helix, they are superposed one above the other. In this case a similar number of knife-bars E, E' are also superposed one above the other, the expansion strips G, G', etc., (in this case shown as formed of wires or rods) and balance-levers being arranged in the same plane, forming a spiral, the lever fulcrum being indicated at J and the lever at I, to which are connected the end expansion strips G, Gˣ, and the weight K' for placing the spiral under tension. By this arrangement of balance-levers and expansion strips in sets, in one single plane, much economy of space is effected, and when desired, a great number of such sets may be suspended upon the knife-bars or fulcra.

Fig. 12ᵃ shows two such sets connected in series, the elements of each set being in a single plane, the sets, however, in parallel planes and the terminal expansion strip Gˣ of the front set connected to one end of the lever I, and the opposite terminal G of this set connected to the shortest one of levers F'ᵃ of the second rear set. The terminal Gʸ of the rear set is connected to the other end of the lever I and thus two or more such spirals may be connected, and the force of expansion and contraction of the combined sets transmitted to the lever I. When a plurality of such combined spirals are suspended from the knife-bars E, the levers connecting their respective terminals may be themselves connected by a system of compound levers such, for example, as shown in Fig. 13, to be hereinafter referred to.

Referring now to Figs. 13 to 20 inclusive, these figures illustrate another form of the invention whereby not only the power-storage device shown in the preceding figures may be dispensed with, but also the main spring of the energy storing device there shown. Both of these elements are supplanted by apparatus effecting the raising and lowering of weights (in this instance shown in the form of balls), the force of expansion and contraction of the coils being utilized to operate a rotary member which elevates a series of weights and discharges the same into a storage receiver, the clock or other machine being operated through the energy so stored and given up by the falling of said weights.

This feature of the invention consists of a frame, located about midway the length of the expansion device, and is supported by securing it to the uprights C, C', or in any other suitable manner.

This frame comprises two horizontally disposed longitudinal members 10ᵃ, 10ᵇ, Figs. 16 and 20, which are connected at each end by cross bars (not shown).

Mounted on the supports 10ᵃ, 10ᵇ, are four uprights 12ᵃ, 12ᵇ, 13ᵃ, 13ᵇ. The uprights 12ᵃ, 12ᵇ are connected at their upper ends by a longitudinal framing member 14ᵃ, Fig. 14, and the uprights 13ᵃ, 13ᵇ are connected by a longitudinal framing member 14ᵇ, said framing members 14ᵃ, 14ᵇ being also in turn connected at their ends by transverse bars (not shown), and so constituting an open frame for the working parts of the apparatus.

Mounted, respectively, upon the members 10ᵃ, 10ᵇ, approximately midway thereof, are two standards 16ᵃ, 16ᵇ, which are rigidly secured together by a cross-bar 17, Fig. 16, said standards and cross-bar constituting a rigid support for the gearing now to be described.

Rotatably mounted upon the standards 16ᵃ, 16ᵇ is a driving shaft 18, one end of which is journaled in the standard 16ᵃ, and the other end in a bearing-bolt 19 passing through the standard 16ᵇ, which, being threaded, is capable of fine adjustment.

Mounted upon and keyed to the shaft 18 is a wheel 20 the spokes 20' of which support a rim 21, Figs. 13 and 16, within which are set a series of pockets 22, the inner surfaces of which are so shaped as to permit their receiving successively, at the bottom of the wheel, a series of balls 23 and holding the same during a travel of 180 degrees, or one-half revolution of the wheel, when they are discharged as hereinafter described. This wheel may be termed an energy-storing wheel, since it rotates and raises the balls through the energy developed by the expansion device.

Loosely mounted on the shaft 18 is a wheel 24, Figs. 14, 15 and 16 smaller in diameter than the wheel 20, the spokes 25 of which, secured to the hub 26, support a rim 27 within which are set a series of pockets 28, which are adapted to receive successively, at the top of the wheel, the balls 23, and discharge the same when they have been lowered through 180 degrees or, in other words, at the bottom of the wheel. The wall of the pockets 28 is formed, for the most part, with a pronounced rounded groove (indicated at 28ᵃ) as shown above the ball in Fig. 18 in which groove lies the ball when the pocket is in its uppermost position. This groove becomes less pronounced toward the opposite wall of the pocket, at which point it is inclined toward one side, as shown in Fig. 18 at 28ᵇ. The object of this arrangement is to readily discharge the ball in this position, and securely hold the same within the pocket when the ball and pocket are in other positions. The wheel 24 designated as the power-transmission wheel is supported upon ball bearings, indicated at 28ᶜ, 28ᵈ, Fig. 16, which are held in position by collars 28ᵉ, 28ᶠ, both rigidly secured to shaft 18.

Mounted upon a hub 29, rigidly secured to the driving shaft 18, is a ratchet wheel 30, Fig. 15, engaged by two pawls 31, 32, secured to one arm of a bell crank pawl-carrier 33, the other arm of which is connected by a rod 34 to a one-armed lever 35, pivoted to a standard 36, while the free end of this lever carries a weight 36ᵃ.

Near the fulcrumed end of the lever 35 connection is made by means of the connecting rods 37 and 38, Figs. 13 and 14, link 39 and rods 40, 41, with two levers indicated at L, L, which are adapted to take power from the expansion coils heretofore described, through the shafts, J, J, to which shafts are also connected the levers I, I. The ends of the latter are connected to strips G, Gˣ of the expansion coil by the wires H, H', as already set forth and clearly illustrated in Figs. 2, 3, 5, 6 and 7.

As shown in Fig. 13, upon contraction of the expansion coils, the wires H, H', will be pulled in the direction indicated by the arrows, the free ends of the levers L, L are lifted, the link 39 is bodily displaced, the rods 38, 37, pull the lever 35, the rod 34 pushes the pawl carrier 33, and the pawls 31, 32 impart rotary motion to the ratchet wheel 30 its shaft 18 and to the power-storing wheel 20. Should the contraction of the expansion device cease, the pawl carrier is returned to its normal position by the weight 36ᵃ, while return motion of the shaft 18 and the wheels rotated thereby, is prevented by a ratchet wheel 42, keyed to the hub 29. The teeth of the wheel 42 are engaged by a detent 43 on a plate 44, secured by the support 45 to the standard 16ᵃ.

The hub 26 of the power transmission wheel 24 is provided with a sprocket wheel 46, adapted to engage and drive a sprocket chain 47 and thereby drive the great wheel of a clock mechanism or gearing of any other machine.

Having shown the mechanism for driving the energy-storing wheel 20, which, as already stated, is rigidly secured to the shaft 18, the mechanism will now be described for driving the power-transmission wheel 24, which runs loose on the shaft 18.

It will be seen in Fig. 16 that the wheel 20 is of greater diameter than the wheel 24.

Suitably mounted between the uppermost rim portions of the wheels, on cross-bars 48, 49, Fig. 14, a series of ball-storage runways are provided, designated in whole at 50, and, as shown in Fig. 16, these runways are laterally inclined downwardly from the wheel 20 to the wheel 24.

Similar ball runways, designated in whole at 51, are provided at and between the lowermost rim portion of the wheels Fig. 20, and mounted upon cross-bars 52, 53, but the last named runways are laterally inclined in the reverse direction to that of the runways 50 namely from the wheel 24 to the wheel 20.

The ball-storage runways 50 comprise inclined floor members 54, 54ᵃ, 54ᵇ, each having longitudinally a slight downward inclination in the direction of the arrows, Fig. 14. These runways also comprise longitudinally extending walls 55, 56, 57, 58, one end of the wall 55 being curved to meet one end of the wall 57, leaving a passageway 59 between it and one end of the wall 56. One end of the wall 58 is similarly curved to meet one end of the wall 56, leaving a passageway 60 between it and one end of the wall 57. Thus are provided parallel runways 61, 62, and 63, with passageways from one to the other, whereby a ball deposited in runway 61 may roll continuously from the upper end of the series of runways to the lower end. The upper runway 61 is provided with an end wall 61ᵃ, and adjacent thereto the longitudinal wall 55 is provided with an opening 61ᵇ to permit the passage of balls from the pockets 22 of the energy-storing wheel 20 to the runway 61.

Projecting through the standard 16ᵇ is a threaded bolt 63ᵃ, the end of which is wedge shaped, as clearly shown in Figs. 14 and 16, the function of which is to successively eject the balls 23 from the uppermost pocket 22 of the wheel 20, as the same revolves and thrust them into the runway 61.

At the end of the lower runway 63 is provided a movable receptacle 64, Fig. 14 and which has a receiving capacity of one ball only. Said receptacle comprises a movable base 65 and a stationary stop wall 66. The base 65 is held to the floor member 54ᵇ of the runway 63 by a horizontally disposed hinge 67, and possesses an extension plate 68, carrying a downwardly extending lever arm 69, having at its lower extremity an outwardly curving portion 70, adapted to engage with the spokes 25 of the wheel 24 and thereby be pressed inwardly. The purpose of this arrangement is to tilt the base plate 65 of the ball receptacle 64, toward the adjacent pocket of the wheel 24 so that a ball may enter a pocket but be prevented from falling therefrom on the opposite side by the stop 71 secured to the standard 16ª. The center of gravity of the lever arm 69 is so located that when the curved lower portion is in its normal position, the base plate 65 will normally project above the floor level of the runway 63 and prevent more than one ball to run into the receptacle 64 at one time.

The ball-storage runways 51 Figs. 16 and 20 comprise inclined floor members 72, 72ª, 72ᵇ, each having a slight downward inclination longitudinally in the direction of the arrows. They also comprise longitudinally extending walls 73, 74, 75, and 76, one end of the wall 73 being curved to meet one end of the wall 75, leaving a passageway 77 between it and one end of the wall 74. One end of the wall 76 is similarly curved to meet one end of the wall 74, leaving a passageway 78 between it and the other end of the wall 75. There are thus formed parallel runways 79, 80, and 81, with passageways from one to the other, whereby a ball deposited at the entrance to the runway 79 will move continuously from that end of the series of runways to the exit of the runway 81. The runway 79 is provided with an end wall 82, and adjacent thereto, the longitudinal wall 76 with an entrance opening 76ª, to permit the entering, at intervals, of balls from the power-transmission wheel 24. Adjacent to the wall 82 is a pin 82ª for deflecting the balls, as they enter the opening 76ª to pass through the runway 79 in the direction of the arrow.

At the exit of the runway 81, Fig. 20, is provided a movable receptacle 83, which has a receiving capacity for one ball only. It comprises a bottom 84 and end stop 85, and is hinged at 86 to the floor 72 of the runway 81. The bottom 34 is further provided with an extension 87, Fig. 19, adapted to be engaged by a shoulder 88 on the ball pockets 22 of the wheel 20 and be depressed in such a way as to eject the ball from the runway and place the same in one of the pockets 22 of the wheel 20.

The hinge 86 (Fig. 19) is off center, and when the bottom 84 of the receptacle 83 is normally tilted the upper end of a pin 89 secured to the bottom 84 contacts with the upper edge of the wall 74, and prevents the rear portion of the base to be depressed too low. As soon as a ball enters the said receptacle, the extension 87 is elevated until it projects above the floor member of the runway 81, serving as a stop to prevent another ball from entering the receptacle. When one ball moves into a pocket 22, another ball quickly moves into the receptacle, taking its position at the rear thereof. This operation takes place while the bottom 84 is level with the floor of the runway 81, and the outer end of the bottom is raised after the shoulder 88 of the wheel 20 has passed by the projection 87.

It will be seen that the energy-storing wheel 20, which takes its motive power through the shaft 18 from the expansion coils, acts to raise the balls or weights from the lower ball runways 51 to the ball storage runways 50. The wheel 20 may act at more or less irregular intervals, while the power transmission wheel 24 acts—and must act—continuously and regularly. This wheel receives its power from the weight of the balls, which are delivered to it when the pockets are in the position of the one shown uppermost in Fig. 15, and are discharged from the pockets when in the position of the one shown lowermost in said figure, in which position of the wheel the approximately flat wall of the pocket, Fig. 18, is lowermost, or under the ball, permitting ready discharge of same. From the delivery side of the power transmission wheel 24, the balls are discharged into the runway 79, being deflected into proper direction by the pin 82ª, thence passing through the passageway 78, through the runway 80 in the direction of the arrow, thence through the opening 77 into the runway 81, thence into receptacle 83, and when the shoulder 88 of the energy-storing wheel 20 reaches a point opposite said receptacle, the base of the latter is depressed, which results in passing a ball into the wheel pocket 22; as the wheel turns and the next pocket 22 arrives in position, another ball is taken on, and so on, as long as there are any balls in the lower runway. When a ball on the wheel 20 reaches the uppermost position, as shown in Fig. 16, it contacts with the ejector 63ª and is thereby passed into the runway 61 and thence to the lower end of that series of runways, and into a pocket 28 of the wheel 24, causing now by its weight the rotation of this wheel, until again discharged into the lower runway.

It will be understood that when this invention is applied to the operation of a clock, the power taken from the power-transmission wheel 24 will be given up gradually being controlled by the pendulum or balance-wheel governed escapement in the usual way.

In the application of this invention, as last above described, the apparatus is designed and built to furnish energy sufficient, not only to run the clock, but provide a surplus for storage. On some days the variation in temperature may be but two degrees, and on other days it may be as high as twenty degrees. If the clock requires for its operation the lowering of three balls each day, the apparatus will be so arranged that with an average daily temperature variation of say six degrees, four balls will be raised, of which three will operate the power transmission wheel and one will be held in storage. With a variation of twelve degrees, eight balls will be raised, of which five balls will be left in storage. If the ball storage runways each have a holding capacity for one hundred balls, and the variation in temperature is greater than required, the balls will quickly be lifted from the lower to the upper runways, but slowly discharged. Assuming, however, that on certain days there will be no or little variation in temperature, and as a result the energy-storing wheel should not, or slowly, revolve, then the balls will quickly be discharged in the power transmission wheel and rotate the same and the running of the clock is not interrupted.

It is to be understood that this invention is not confined to the precise details of construction and arrangement of parts as herein set forth and described or to the materials specified, and modification and variations may be made without departing from the spirit of the invention as defined by the appended claims.

As new and useful is claimed and desired to be secured by Letters Patent of the United States—

1. In a thermal motor, an expansion device comprising members capable of expansion and contraction by variations in temperature, levers alternately connected thereto and interposed therebetween, and a power device having operative connection with, and acted upon by the displacement of, the free ends of said expansion device.

2. In a thermal motor, an expansion device comprising members capable of expansion and contraction by variations in temperature, levers alternately connected thereto and interposed therebetween, a power device having operative connection with, and acted upon by the displacement of, the free ends of said expansion device, and a stress device adapted to oppose contraction of said expansion device.

3. An expansion device comprising, in a single plane, a plurality of members capable of expansion and contraction by variations in temperature, a plurality of levers alternately connected thereto and interposed therebetween, and a power device to which the free ends of said members are connected and by which it is operatively moved.

4. An expansion device comprising, in a single plane, a plurality of members of different length and capable of expansion and contraction by variations in temperature, and a set of levers of different length interposed in series therewith.

5. A thermal motor comprising in a single plane a plurality of members of different length and capable of expansion and contraction by variations in temperature, a set of levers of different length interposed in series therewith, and fulcra for said levers and arranged in sets, the fulcra of one set being opposite to the ones of the other set.

6. An expansion device comprising a plurality of sections of expansible material of differing lengths combined with interposed lever members also of differing lengths, the said levers and sections being arranged in a single plane, fulcra for said levers, said levers and fulcra being divided into two sets, the fulcra of one set being opposite those of the other set.

7. An expansion device comprising a series of parallel lever members, a second set of similar lever members, a series of parallel sections of expansible material connecting the lever ends of one set with the lever ends of the second set in sequence, and a fulcrumed lever having operative connection with the terminal sections of expansible material.

8. An expansion device comprising a series of parallel lever members, a second set of similar lever members, a series of parallel sections of expansible material connecting the lever ends of one set with the lever ends of the second set in sequence, a fulcrumed lever having operative connection with the terminal sections of expansible material, and a tension member acting on said lever.

9. In combination, an expansion device comprising a plurality of expansible sections, a power device connected to and operated by the free ends of said expansion device, and a second expansion device operating on said first named expansion device to supplement the power of said power device.

10. An expansion device consisting of a set of expanding and contracting members, a rocking member operated thereby, and a second expansion device operated bodily by said rocking member and consisting of a plurality of expansible sections, and interconnecting levers.

11. An expansion device consisting of a set of expanding and contracting members, and a second set operated bodily by said first named set, and of expanding and contracting members consisting of a plurality of expansible sections and intervening lever members.

12. An expansion device consisting of a primary expansion system, a secondary expansion system operated bodily by said primary system and comprising a plurality of expansible sections with intervening lever members, and a power device operated by the expansion and contraction of said secondary system supplemented by the expansion of said primary system.

13. The combination with a plurality of expansion coils, responding to changes in temperature, of a plurality of translating members, connected to said coils and operated thereby, and a plurality of power-transmitting levers connected to said translating members.

14. A thermal motor comprising in a single plane a plurality of members of different lengths and capable of expansion and contraction by variations in temperature, a set of levers of different lengths interposed in series therewith and fulcra for said levers arranged in sets, the fulcra of one set being opposite to the ones of the other set, and the fulcra of both sets being also in a single plane.

FRIEDRICH BANGERTER.

Witnesses:
LAURA E. SMITH,
VIOLA IRVIN.